(12) United States Patent
Buissette et al.

(10) Patent No.: US 9,290,693 B2
(45) Date of Patent: Mar. 22, 2016

(54) COMPOSITION CONTAINING A CORE-SHELL ALUMINATE, PHOSPHOR OBTAINED FROM SAID COMPOSITION, AND PREPARATION METHODS

(75) Inventors: Valérie Buissette, Paris (FR); Thierry Le-Mercier, Rosny-sous-Bois (FR); Franck Aurissergues, Argenteuil (FR)

(73) Assignee: RHODIA OPERATIONS, Paris (FR)

( * ) Notice: Subject to any disclaimer, the term of this patent is extended or adjusted under 35 U.S.C. 154(b) by 114 days.

(21) Appl. No.: 13/992,192

(22) PCT Filed: Nov. 10, 2011

(86) PCT No.: PCT/EP2011/069851
§ 371 (c)(1),
(2), (4) Date: Aug. 12, 2013

(87) PCT Pub. No.: WO2012/079863
PCT Pub. Date: Jun. 21, 2012

(65) Prior Publication Data
US 2013/0313479 A1 Nov. 28, 2013

(30) Foreign Application Priority Data
Dec. 14, 2010 (FR) ...................................... 10 04859

(51) Int. Cl.
C09K 11/77 (2006.01)
C09K 11/02 (2006.01)
C04B 35/628 (2006.01)

(52) U.S. Cl.
CPC ....... C09K 11/7774 (2013.01); C04B 35/62897 (2013.01); C09K 11/02 (2013.01)

(58) Field of Classification Search
CPC ...... C09K 11/02; C09K 11/025; C09K 11/08; C09K 11/7706; C09K 11/7721; C09K 11/7749; C09K 11/7774; C04B 2235/5445; C04B 2235/5436; C04B 2235/5454; C04B 35/62813; C04B 35/62897; B82Y 30/00; B82Y 40/00; B82Y 20/00
USPC ............ 252/301.4 R; 313/503; 428/402, 403; 977/773, 811
See application file for complete search history.

(56) References Cited

U.S. PATENT DOCUMENTS

| | | | |
|---|---|---|---|
| 2004/0256601 A1* | 12/2004 | Hubacek et al. | 252/500 |
| 2006/0273286 A1 | 12/2006 | Delespierre et al. | |
| 2007/0087195 A1* | 4/2007 | Meyer et al. | 428/403 |
| 2012/0049117 A1 | 3/2012 | Buissette et al. | |
| 2012/0107624 A1 | 5/2012 | Klauth et al. | |

FOREIGN PATENT DOCUMENTS

| | | |
|---|---|---|
| CN | 1780895 A | 5/2006 |
| DE | 20 2009 008 015 U1 | 11/2010 |
| JP | 08/504871 A | 5/1996 |
| JP | 2003/027051 A | 1/2003 |
| JP | 2007/513038 A | 5/2007 |
| WO | 94/14920 A1 | 7/1994 |
| WO | 2010/108860 A1 | 9/2010 |

OTHER PUBLICATIONS

Kamiya et al, "Phosphors for lamps," Phosphor Handbook, 1999, pp. 389-394, CRC Press LLC, Boca Raton, FL, USA.
Liu et al, "Synthesis and characterization of monodisperse spherical core-shell structured SiO2@Y3A15O12:Ce3+/Tb3 + phosphors for field emission displays," Journal of Nanoparticle Research, 2007, pp. 869-875, vol. 9.
Yu et al, "Silica Spheres Coated with YVO4:Eu3+ Layers via Sol-Gel Process: A Simple Method to Obtain Spherical Core—Shell Phosphors," Chem. Mater., 2005, pp. 1783-1791, vol. 17.
International Search Report issued on Jan. 27, 2012, by the European Patent Office as the International Searching Authority in corresponding International Patent Application No. PCT/EP2011/069851.

* cited by examiner

*Primary Examiner* — Matthew E Hoban
*Assistant Examiner* — Lynne Edmondson

(57) ABSTRACT

A composition comprising an inorganic core and an aluminate shell is described. The aluminate can have the formula (1):

$$(Ce_aTb_b)Mg_{1+x}Al_{11+y}O_{19+x+y}  \qquad (1),$$

where a, b, x and y comply with the relations $a+b=1 - 0.2 \le x \le +0.2$ and $-0.2 \le y \le +0.2$, wherein the shell uniformly covers the inorganic core over a thickness of no less than 300 nm. A phosphor is also described that can be obtained by calcinating the composition at a temperature of at least 1200° C.

15 Claims, No Drawings

COMPOSITION CONTAINING A CORE-SHELL ALUMINATE, PHOSPHOR OBTAINED FROM SAID COMPOSITION, AND PREPARATION METHODS

CROSS-REFERENCE TO PRIOR APPLICATIONS

This application is a National Stage of PCT/EP2011/069851, filed Nov. 10, 2011, and designating the United States (published in French on Jun. 21, 2012, as WO 2012/079863 A1), which claims priority under 35 U.S.C. §119 to FR 10/04859, filed Dec. 14, 2010, each hereby expressly incorporated by reference in its entirety and each assigned to the assignee hereof.

The present invention relates to a composition based on an aluminate, of core/shell type, to a phosphor resulting from this composition and to their processes of preparation.

Aluminates based on cerium and on terbium are well known for their luminescence properties. They emit a green light when they are irradiated by certain types of high energy radiation. Phosphors making use of this property are commonly used on the industrial scale, for example in trichromatic fluorescent lamps or in plasma systems.

These phosphors comprise rare earth metals, the price of which is high and also subject to major fluctuations. The reduction in cost of these phosphors thus constitutes an important challenge.

Furthermore, the rarity of some rare earth methods, such as terbium, is resulting in attempts to reduce the amount thereof in the phosphors.

The object of the invention is to provide phosphors exhibiting the properties of the phosphors which are currently known but having a lower cost.

With this aim, the invention relates to a composition which is characterized in that it comprises:
an inorganic core;
a shell based on an aluminate of formula:

$$(Ce_aTb_b)Mg_{1+x}Al_{11+y}O_{19+x+y} \quad (1)$$

in which a, b, x and y comply with the relationships:

$$a+b=1$$

$$-0.2 \leq x \leq +0.2$$

$$-0.2 \leq y \leq +0.2$$

and homogeneously covering the inorganic core over a thickness equal to or greater than 300 nm.

The invention also relates to a phosphor which exhibits a core and a shell as described above and which is obtained from the composition of the invention.

Other characteristics, details and advantages of the invention will become even more fully apparent on reading the description which will follow, and also the various concrete and nonlimiting examples intended to illustrate it.

It is also specified, for the continuation of the description, that, unless otherwise indicated, throughout all the ranges or boundaries of values which are given, the values at the limits are included, the ranges or boundaries of values thus defined therefore covering any value at least equal to and greater than the lower limit and/or at most equal to or lower than the upper limit.

The term "rare earth metal" is understood to mean, for the continuation of the description, the elements of the group consisting of scandium, yttrium and the elements of the periodic table with an atomic number between 57 and 71 inclusive.

In addition, the calcinations for a given temperature and a given time correspond, unless otherwise indicated, to calcinations under air at a stationary temperature state over the time indicated.

The term "specific surface" is understood to mean the B.E.T. specific surface determined by nitrogen adsorption in accordance with the standard ASTM D 3663-78 drawn up from the Brunauer-Emmett-Teller method described in the periodical "The Journal of the American Chemical Society, 60, 309 (1983)".

As has been seen above, the invention relates to two types of products: compositions comprising an aluminate, also known subsequently as "compositions" or "precursors", and phosphors obtained from these precursors. For their part, the phosphors have luminescence properties which are sufficient to render them able to be used directly in the design applications. The precursors do not have luminescence properties or, possibly, luminescence properties which are generally too weak for use in these same applications.

These two types of products will now be described in more detail.

The compositions Comprising an Aluminate or Precursors

The composition of the invention comprising an aluminate are characterized by their specific structure of core/shell type which will be described below.

The inorganic core is based on a material which can in particular be an oxide or a phosphate.

Mention may in particular be made, among the oxides, of the oxides of zirconium (zirconia), of zinc, of titanium, of magnesium or of aluminum (alumina) and the oxides of one or more rare earth metals, one of which may possibly act as dopant. Mention may more particularly still be made, as rare earth oxide, of gadolinium oxide, yttrium oxide and cerium oxide.

Yttrium oxide, gadolinium oxide, zirconia, optionally doped with a rare earth metal, and alumina can preferably be chosen. Alumina can more preferably still be chosen as it exhibits in particular the advantage of making possible calcination at a higher temperature during the change from the precursor to the phosphor, without diffusion of the dopant into the core being observed. This thus makes it possible to obtain a product having optimum luminescence properties as the result of better crystallization of the shell, a consequence of the higher calcination temperature.

Mention may be made, among the phosphates, of the orthophosphates of one or more rare earth metals, one of which may possibly act as dopant, such as lanthanum ($LaPO_4$), lanthanum and cerium (($LaCe$)$PO_4$), yttrium ($YPO_4$) or gadolinium, and also of the polyphosphates of rare earth metals or of aluminum.

Mention may be also be made of alkaline earth metal phosphates, such as $Ca_2P_2O_7$, zirconium phosphate $ZrP_2O_7$ or alkaline earth metal hydroxyapatites.

Furthermore, other inorganic compounds are suitable, such as vanadates, in particular rare earth metal vanadates, ($YVO_4$), germinates, silicates, in particular zinc or zirconium silicate, tungstates, molybdates, sulphates ($BaSO_4$), borates ($YBO_3$, $GdBO_3$), carbonates and titanates (such as $BaTiO_3$), zirconates, rare earth metal aluminates, such as yttrium aluminate $Y_3Al_5O_{12}$, optionally doped with cerium, perovskites, such as $YAlO_3$ or $LaAlO_3$, it being possible for these perovskites to be doped with cerium, optionally, or also alkaline earth metal aluminates, optionally doped with a rare earth metal other than terbium or europium, such as barium and/or magnesium aluminates, such as $MgAl_2O_4$, $BaAl_2O_4$, $BaMgAl_{10}O_{17}$, or $LnMgAl_{11}O_{19}$, Ln denoting at least one rare earth metal other than terbium or europium.

Magnesium aluminates may be preferred.

Finally, the compounds resulting from the preceding compounds may be appropriate, such as mixed oxides, in particular of rare earth metals, for example mixed zirconium and cerium oxides, mixed phosphates, in particular of rare earth metals, and phosphovanadates.

The expression "the inorganic core is based on" is intended to denote an assembly comprising at least 50%, preferably at least 70% and more preferably at least 80%, indeed even 90%, by weight of the material under consideration. According to a specific embodiment, the core can be essentially composed of said material (namely in a content of at least 95% by weight, for example at least 98% by weight, indeed even at least 99% by weight) or can also be entirely composed of this material.

The core can have a mean diameter of in particular between 1 and 10 μm, preferably of between 2.5 μm and 7 μm.

These diameter values can be determined by scanning electron microscopy (SEM) by statistical counting of at least 150 particles.

The dimensions of the core, as well as those of the shell which will be described later, can also be measured in particular on transmission electron microscopy photographs of sections of the compositions/precursors of the invention.

The other structural characteristic of the compositions/precursors of the invention is the shell.

This shell homogeneously covers the core over a given thickness which is equal to or greater than 300 nm. The term "homogeneous" is understood to mean a continuous layer which completely covers the core and which has a thickness which is preferably never less than the given value of 300 nm. This homogeneity is visible in particular on SEM photographs. X-ray diffraction (XRD) measurements in addition demonstrate the presence of two separate compositions between the core and the shell.

The thickness of the shell can more particularly be at least 500 nm. It can be equal to or less than 2000 nm (2 μm), more particularly between 750 nm and 1500 nm.

The shell is based on an aluminate of formula (1).

In addition, the aluminate of formula (1) can, in a known way, comprise additional elements, known as "substituents", as these elements are regarded as partially substituting for the elements Ce, Tb, Mg and Al. These substitutions make it possible in particular to modify the luminescence properties of the phosphors resulting from the compounds of the invention.

Examples of these substituents will be given below for each constituent element on the basis of what is commonly accepted currently in the state of the art. This implies that it would not be departing from the present invention if a substituent described for a given constituent element proved subsequently in fact to be substituting for another constituent element than that assumed in the present description.

Thus, Ce and/or Tb can be partially substituted for by at least one rare earth metal which can in particular be gadolinium, europium, neodymium, lanthanum and dysprosium, it being possible for these elements to be taken alone or in combination.

Magnesium can also be partially substituted for by at least one element chosen from calcium, zinc, manganese or cobalt.

Finally, aluminum can also be partially substituted for by at least one element chosen from gallium, scandium, boron, germanium, phosphorus or silicon.

The substitutions make it possible to modify the luminescence properties of the phosphors resulting from the compositions of the invention.

The amounts of these substituents can vary, in a known way, within wide ranges; the minimum amount of substituent is that below which the substituent no longer produces an effect and it is generally and in a known way at least several ppm and it can range up to several percent.

Generally, however, the amount of substituent for the magnesium is at most 30%, more particularly at most 20% and more particularly still at most 10%, this amount being expressed as atom % (substituent/(substituent+Mg) atomic ratio). For the aluminum, this amount, expressed in the same way, is generally at most 15%. The minimum amount of substituent can be at least 0.1%, for example. For the cerium and/or the terbium, this amount, still expressed in the same way, is generally at most 5%.

The proportions of cerium and of terbium and their relative proportion can vary within very wide limits. The minimum content of cerium or terbium is that below which the product would no longer exhibit the luminescent property. More particularly, however, and with reference to the formula (1), the value of a can be between 0.5 and 0.8 and the value of b can be between 0.2 and 0.5.

The invention applies in particular to the aluminates of formula (1) in which x=y=0.

The compositions/precursors of the invention are composed of particles which exhibit a mean diameter which is preferably between 1.5 μm and 15 μm. This diameter can more particularly be between 3 μm and 10 μm and more particularly still between 4 μm and 8 μm.

The mean diameter to which reference is made is the mean by volume of the diameters of a population of particles.

The particle size values given here and for the remainder of the description are measured by the laser particle sizing technique, for example using a laser particle size of Malvern type, on a sample of particles dispersed in water with ultrasound (130 W) for 1 minute 30 seconds.

Furthermore, the particles preferably have a low dispersion index, typically of at most 0.7, more particularly of at most 0.6 and more particularly still at most 0.5.

The term "dispersion index" of a population of particles is understood to mean, within the meaning of the present invention, the ratio I as defined in the formula (2) below:

$$I=(D_{84}-D_{16})/(2 \times D_{50}) \qquad (2),$$

where: $D_{84}$ is the diameter of the particles for which 84% of the particles have a diameter of less than $D_{84}$;

$D_{16}$ is the diameter of the particles for which at least 16% of the particles have a diameter of less than $D_{16}$; and $D_{50}$ is the mean diameter of the particles, the diameter for which 50% of the particles have a diameter of less than $D_{50}$.

Although the compositions or precursors according to the invention may possibly exhibit luminescence properties at wavelengths which can vary as a function of the composition of the product and after exposure to radiation of a given wavelength, it is possible and even necessary to further improve these luminescence properties by carrying out post-treatments on the products, this being done in order to obtain a true phosphor which can be used directly as such in the desired application.

It is understood that the border between a simple precursor and a true phosphor remains arbitrary and depends only on the luminescence threshold starting from which it is considered that a product can be directly employed in an acceptable way by a user.

In the present case and fairly generally, compositions according to the invention which have not been subjected to heat treatments greater than approximately 950° C. can be regarded and identified as phosphor precursors as such products generally exhibit luminescence properties which can be considered not to satisfy the minimum criterion of luminosity of the commercial phosphors capable of being used directly and as is, without any subsequent transformation. Conversely, the compositions which, optionally after having been subjected to appropriate treatments, develop luminosities suitable and sufficient for being used directly by an applicator, for example in trichromatic lamps, can be described as phosphors.

The phosphors according to the invention will be described below.

The Phosphors

The phosphors of the invention exhibit the same structure as the compositions or precursors described above. They thus comprise an inorganic core, a shell based on the aluminate of formula (1) and a thickness of at least 300 nm.

Thus, everything which has been described above on the subject of these precursors likewise applies here for the description of the phosphors according to the invention, in particular that which concerns the characteristics with regard to the structure composed of the inorganic core and the homogeneous shell, with regard to the nature of the inorganic core and with regard to the thickness of the shell, which, here also, can be equal to or greater than 300 nm, and also the particle size characteristics, it being possible for the particles of the phosphors thus to exhibit a mean diameter of between 1.5 µm and 15 µm.

The processes of the preparation of the precursors and of the phosphors of the invention will now be described.

The Process for the Preparation of the Compositions or Precursors

The process for the preparation of the compositions/precursors is characterized in that it comprises the following stages:
- a liquid mixture is formed comprising compounds of aluminum and of the other elements, cerium, terbium and magnesium, and the inorganic core;
- the said mixture is dried by atomization;
- the dry product is calcined at a temperature of between 700° C. and 950° C.

As indicated above, this process comprises a first stage in which a liquid mixture is formed, which mixture is a solution or a suspension or also a gel of the compounds of aluminum and of the other elements cerium, terbium and magnesium, this mixture additionally comprising the inorganic core. This mixture can also comprise the substituent elements which have been mentioned above.

Use is usually made, as compounds of the elements aluminum, cerium, terbium, magnesium and optionally substituent, of the inorganic salts or also the hydroxides. Mention may be made, as salts, of preferably nitrates, in particular for aluminum, europium and magnesium. Sulphates, in particular for aluminum, chlorides or also organic salts, for example acetates, can optionally be employed.

Use may also be made, as aluminum compound, of a sol or colloidal dispersion of aluminum. Such a colloidal dispersion of aluminum can exhibit particles or colloids having a size of between 1 nm and 300 nm. The aluminum can be present in the sol in the boehmite form.

The following stage consists in drying the prepared mixture. This drying is carried out by atomization.

The term "drying by atomization" is understood to mean drying by spraying the mixture into a hot atmosphere (spray drying). The atomization can be carried out by means of any sprayer known per se, for example by a spraying nozzle of the shower head or other type. Use may also be made of "rotary" atomizers. Reference may in particular be made, with regard to the various spraying techniques capable of being employed in the present process, to the work Handbook of Industrial Drying, Chapter 10, Industrial spray-drying systems, Arun S., Numjumbar 2007.

The final stage of the process consists in calcining the product obtained on the conclusion of the drying.

The calcination is carried out at a temperature of between 700° C. and 950° C., more particularly between 700° C. and 900° C.

The calcination is generally carried out under air. The precursor compound of the invention is obtained on conclusion of this calcination.

The Process for the Preparation of the Phosphors

The phosphors of the invention are obtained by calcination, at a temperature of at least 1200° C., of the compositions or precursors as described above or of the compositions or precursors obtained by the process which has also been described above. It should be noted that this is a lower temperature than that necessary for the preparation of a phosphor by the chamotting route. This temperature can more particularly be at least 1400° C. The compositions or precursors are converted into efficient phosphors by this treatment.

Although, as has been indicated above, the precursors may themselves exhibit intrinsic properties of luminescence, these properties are generally insufficient for the applications targeted and they are greatly improved by the calcination treatment.

The calcination can be carried out under air or under inert gas but also preferably under a reducing atmosphere ($H_2$, $N_2/H_2$ or $Ar/H_2$, for example) in order, in the latter case, to convert all of the Ce and Tb entities to their oxidation state (+III).

In a known way, the calcination can be carried out in the presence of a flux of fluoride type, such as, for example, lithium fluoride, aluminum fluoride or magnesium fluoride.

It is also possible to carry out the calcination in the absence of any flux and thus without premixing the flux with the precursor.

After treatment, the particles are advantageously washed, so as to obtain a phosphor which is as pure as possible and in a deagglomerated or weakly agglomerated state. In the latter case, it is possible to deagglomerate the phosphor by subjecting it to a deagglomeration treatment under gentle conditions, of the bead milling type, for example.

The abovementioned heat treatments make it possible to obtain phosphors which retain a core/shell structure and a particle size distribution similar to those of the particles of the precursor.

In addition, the heat treatment can be carried out without inducing noticeable phenomena of diffusion of the Ce and Tb entities from the external layer of the phosphor towards the core.

According to a specific embodiment of the invention which can be envisaged, it is possible to carry out, in one and the same stage, the heat treatment described for the preparation of the precursor and the calcination for the conversion of the precursor into phosphor. In this case, the phosphor is obtained directly without stopping at the precursor.

The phosphors of the invention can be used as green phosphors and they can thus be used in the manufacture of any apparatus which incorporates phosphors, such as trichromatic lamps, light-emitting diodes and plasma screens.

They can also be used in UV excitation labeling systems.

They can also be dispersed in organic matrices (for example, plastic matrices or polymers which are transparent under UV, and the like), inorganic matrices (for example silica) or organic/inorganic hybrid matrices.

The invention consequently relates to a device of trichromatic lamp, light-emitting diode or plasma screen type comprising the phosphor of the invention or to a device of the same type which is manufactured by using the phosphor of the invention.

This phosphor is used in the manufacture of the devices described above according to well known techniques, for example by silkscreen printing, by spraying, by electrophoresis, by sedimentation or by deep coating.

Examples will now be given.

In these examples, the following reactants are used:
boehmite comprising 73.5% of $Al_2O_3$
2.88M $Ce(NO_3)_3$ solution
2.6M $Tb(NO_3)_3$ solution
$Mg(NO_3)_2.6H_2O$
alumina of -alumina type, of spherical morphology, $D_{50}$=3 μm (laser particle sizing), BET specific surface <1 m²/g.

Luminescence Efficiency

The photoluminescence efficiency (PL) of the phosphors was measured by integration of the emission spectrum between 450 nm and 700 nm, under excitation at 254 nm, using a Jobin-Yvon spectrophotometer. The photoluminescence efficiency of example 1 is taken as reference, with a value of 100.

Electron Microscopy

The transmission of electron microscopy photographs are taken on a section (microtomy) of the particles, using an SEM microscope. The spatial resolution of the apparatus for the measurements of chemical composition by EDS (energy dispersive spectroscopy) is <2 nm. The correlation of the morphologies observed and of the chemical compositions measured makes it possible to demonstrate the core/shell structure and to measure, on the photographs, the thickness of the shell.

The measurements of chemical composition can also be carried out by EDS on photographs taken by STEM-HAADF. The measurement corresponds to a mean taken over at least two spectra.

Comparative Example 1

This example relates to a product according to the prior art of formula

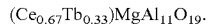
$(Ce_{0.67}Tb_{0.33})MgAl_{11}O_{19}$.

a) Preparation of the precursor 100 g of boehmite are mixed with 1 l of water with stirring. The pH of the suspension is then 5. 19.08 g of 5 mol/l $HNO_3$ are added to bring the pH down to 2, the suspension is left standing for 24 h and a stable boehmite sol is obtained.

52.3 g and 28.8 g respectively of the cerium and terbium nitrate solutions, and also 33.6 g of magnesium nitrate, are mixed.

The mixture obtained is added to the boehmite sol and water is added, so that the solids content of the suspension is less than 7%.

The suspension is subsequently atomized on the Büchi (inlet temperature: 250° C., and outlet temperature: 115° C.). The solid is subsequently calcined at 900° C. for 2 h under air.

b) Preparation of the phosphor 0.1238 g of $MgF_2$ (i.e. 10% mol/mol) is added to 15 g of the precursor synthesized above and mixing is carried out for 30 minutes.

The mixture is subsequently transferred into a rectangular crucible and calcined under a reducing atmosphere (Ar/$H_2$ at 5%) at 1470° C. for two hours.

The product obtained is subsequently washed with 300 ml of hot water at 80° C. for 3 h, filtered off and dried in an oven.

Example 2

This example relates to a product of core/shell type according to the invention, the core of which is made of alumina and the shell of which corresponds to the formula

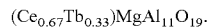
$(Ce_{0.67}Tb_{0.33})MgAl_{11}O_{19}$.

a) Preparation of the Precursor 49.4 g of boehmite are mixed with 0.31 of water with stirring. The pH of the suspension is then 5. 9.3 g of 5 mol/l $HNO_3$ are added to bring the pH down to 2, the suspension is left standing for 24 h and a stable boehmite sol is obtained.

25.8 g and 14.2 g respectively of the cerium and terbium nitrate solutions, and also 16.6 g of magnesium nitrate, are mixed.

The mixture obtained is added to the boehmite sol. 0.8 l of water and then 4.4 g of alumina, as core, are also added, so that the core/shell molar ratio is 40% of core and 60% of shell.

The suspension is subsequently atomized on the Büchi (inlet temperature: 250° C., and outlet temperature: 115° C.). The solid is subsequently calcined at 900° C. for 2 h under air.

b) Preparation of the Phosphor 0.1283 g of $MgF_2$ (i.e. 10% mol/mol or 0.8% w/w) is added to 15 g of the precursor synthesized above and mixing is carried out for 30 minutes on a Turbula.

The mixture is subsequently transferred into a rectangular crucible and calcined under a reducing atmosphere (Ar/$H_2$ at 5%) at 1470° C. for 2 hours.

The product obtained is subsequently washed with 300 ml of hot water at 80° C. for 3 h, filtered off and dried in an oven.

The characteristics of the products obtained in the preceding examples are given in the table below.

|  | $D_{50}$ (μm) | Dispersion index I | PL | R* |
|---|---|---|---|---|
| Precursor ||||| 
| Example 1 | 4.4 | 0.85 | — | — |
| Example 2 | 3.6 | 0.61 | — | — |
| Phosphor ||||| 
| Example 1 | 8.7 | 0.97 | 100 | 80 |
| Example 2 | 7.5 | 0.56 | 101 | 73 |

*R denotes the ratio by weight of terbium with respect to the phosphor, expressed in g of $Tb_4O_7$ with respect to the weight of the phosphor in kg.

The examination by conventional SEM over a representative number of photographs of the precursor and phosphor of example 2 does not reveal the presence of particles of alumina core.

The precursor and phosphor of example 2 furthermore exhibit, by observation in SEM over a product section, a typical morphology of core/shell type.

It is found, from the results of the table, that the product of the invention, although exhibiting a lower content of terbium than that of the comparative product, provides a slightly greater luminescence efficiency.

The invention claimed is:

1. A process for the preparation of a composition, the composition comprising:
   an inorganic core; and
   a shell based on an aluminate of formula (1):

$$(Ce_aTb_b)Mg_{1+x}Al_{11+y}O_{19+x+y} \quad (1),$$

wherein:
   $a+b=1$,
   $-0.2 \le x \le +0.2$, and
   $-0.2 \le y \le +0.2$;
   and wherein the shell homogeneously covers the inorganic core at a thickness equal to or greater than 300 nm,
   wherein the process comprises:
      forming a liquid mixture comprising compounds of aluminum, magnesium and one or both of cerium and terbium, and the inorganic core;
      drying the mixture by atomization; and
      calcining the dry product at a temperature of between 700° C. and 950° C.

2. The process as defined by claim 1, wherein the aluminum compound is in the form of an aluminum sol.

3. The process as defined by claim 1, wherein the shell covers the inorganic core at a thickness equal to or less than 2000 nm.

4. The process as defined by claim 3, wherein the shell covers the inorganic core at thickness between 750 nm and 1500 nm.

5. The process as defined by claim 1, wherein the aluminate corresponds to the formula (1) in which x=y=0.

6. The process as defined by claim 1, wherein the inorganic core is alumina, zirconia or an alkaline earth metal aluminate.

7. The process as defined by claim 6, wherein the alumina or zirconia is doped.

8. The process as defined by claim 6, wherein the alkaline earth metal aluminate is a magnesium aluminate.

9. A process for the preparation of a phosphor, the phosphor comprising:
   an inorganic core; and
   a shell based on an aluminate of formula (1):

$$(Ce_aTb_b)Mg_{1+x}Al_{11+y}O_{19+x+y} \quad (1),$$

wherein:
   $a+b=1$,
   $-0.2 \le x \le +0.2$, and
   $-0.2 \le y \le +0.2$;
   wherein the shell homogeneously covers the inorganic core at a thickness equal to or greater than 300 nm,
   wherein the process comprises:
      preparing a composition using the process as defined by claim 1, and
      calcining the composition at a temperature of 1200° C.

10. The process as defined by claim 9, wherein the shell covers the inorganic core at a thickness equal to or less than 2000 nm.

11. The process as defined by claim 10, wherein the shell covers the inorganic core at thickness between 750 nm and 1500 nm.

12. The process as defined by claim 9, wherein the aluminate corresponds to the formula (1) in which x=y=0.

13. The process as defined by claim 9, wherein the inorganic core is alumina, zirconia or an alkaline earth metal aluminate.

14. The process as defined by claim 13, wherein the alumina or zirconia is doped.

15. The process as defined by claim 13, wherein the alkaline earth metal aluminate is a magnesium aluminate.

* * * * *